US006614967B1

(12) United States Patent
Devenyi et al.

(10) Patent No.: US 6,614,967 B1
(45) Date of Patent: Sep. 2, 2003

(54) OPTICAL POSITIONING OF AN OPTICAL FIBER AND AN OPTICAL COMPONENT ALONG AN OPTICAL AXIS

(75) Inventors: Gabor Devenyi, Penetang (CA); Roger W. Ball, Penetang (CA); Kevin Wagner, Victoria Harbour (CA)

(73) Assignee: Raytheon Company, Lexington, MA (US)

( * ) Notice: Subject to any disclaimer, the term of this patent is extended or adjusted under 35 U.S.C. 154(b) by 176 days.

(21) Appl. No.: 09/930,826

(22) Filed: Aug. 14, 2001

(51) Int. Cl.[7] ................................................. G02B 6/42
(52) U.S. Cl. ....................................................... 385/52
(58) Field of Search ............................. 385/52, 88, 92, 385/32, 33, 16, 50, 130, 14, 15, 27, 83, 89, 129, 131, 137

(56) References Cited

U.S. PATENT DOCUMENTS

| | | | | |
|---|---|---|---|---|
| 4,696,062 A | * | 9/1987 | LaBuddle | 359/159 |
| 5,333,208 A | * | 7/1994 | Massen et al. | 382/8 |
| 5,574,811 A | * | 11/1996 | Bricheno et al. | 385/52 |
| 5,638,169 A | | 6/1997 | Hollmann et al. | |
| 6,005,965 A | * | 12/1999 | Tsuda et al. | 382/145 |
| 2002/0114566 A1 | * | 8/2002 | Fairchild et al. | 385/33 |

* cited by examiner

*Primary Examiner*—Jean F. Duverne
(74) *Attorney, Agent, or Firm*—William C. Schubert; Glenn H. Lenzen, Jr.

(57) ABSTRACT

An optical fiber and an optical component, such as a collimating lens, are positioned along an optical axis. An alignment end of the optical fiber is first positioned so that the optical fiber axis is coincident with the optical axis, and visible light passing through the optical fiber is focused upon an imaging light detector, without the optical component present on the optical axis. The optical component is inserted onto the optical axis and coarse positioned using visible light transmitted through the optical fiber and through the optical component to be incident upon a light energy detector. The optical component is thereafter fine positioned using infrared light transmitted through the optical fiber and through the optical component to be incident upon the imaging light detector. The optical fiber and the optical component are thereafter fixed in position.

20 Claims, 3 Drawing Sheets

OPTICAL POSITIONING OF AN OPTICAL FIBER AND AN OPTICAL COMPONENT ALONG AN OPTICAL AXIS

This invention relates to the optical positioning and alignment of an optical fiber and an optical component such as a collimating lens.

BACKGROUND OF THE INVENTION

During assembly, optical systems having multiple optical elements must be precisely optically aligned. Absent such optical alignment, there may be significant transmission losses within the optical system. The misalignment transmission losses between each pair of optical elements is multiplied with increasing numbers of optical elements, so that misalignments in complex systems may result in a large attenuation of the optical energy in the light beam. The input light beam may not be arbitrarily increased in power to account for these transmission losses, as some of the optical elements are typically limited as to the power levels that they can transmit without damage to the optical elements.

In one important example, when a light beam leaves an optical fiber there is some angular dispersion in the light beam. The light beam is thereafter collimated by a collimating lens before passing to other optical elements. The optical fiber axis at the output end of the optical fiber must be precisely positioned and aligned with the collimating lens and the downstream optical elements to avoid transmission losses at this point of the optical system.

The positioning of the optical components to accomplish their precision alignment has traditionally been accomplished using a mechanical alignment process. In the case of aligning an optical fiber to other optical components, the outer surface of the outer jacket of the optical fiber is grasped, usually in a bushing-like hollow tube, and mechanically aligned manually. The present inventors have recognized that this approach has significant shortcomings, both because the light-transmitting core of the optical fiber may not be locally coaxial with the outer surface of the outer jacket, and because there is significant likelihood that operator fatigue and inattention will adversely affect the alignment procedure. There is a substantial possibility that the attempted alignment will not be precise, and that the error in the alignment will not be predictable or repeated.

There is a need for an improved approach to the positioning and optical alignment of optical systems that achieves improved optical alignment and also avoids operator error. The present invention fulfills this need, and further provides related advantages.

SUMMARY OF THE INVENTION

The present invention provides a method for optically positioning an optical fiber and an optical component along an optical axis, leading to an accurate alignment of the optical fiber and the optical component. The method is highly precise and repeatable, and does not rely on any assumption as to the coaxiality of the core and the outer jacket of the optical fiber. It may be automated so that it is not dependent upon the performance of the human operator.

In accordance with the invention, a method for optically positioning an optical fiber and an optical component along an optical axis comprises the steps of furnishing the optical fiber having an alignment end with an optical fiber axis, and furnishing the optical component, which may be of any type but is preferably a collimating lens such as a gradient-index-of-refraction lens. The alignment end of the optical fiber may be its input end or its output end, but is preferably its output end. The alignment end of the optical fiber is positioned so that the optical fiber axis is coincident with the optical axis, and light (preferably visible light) passing through the optical fiber is focused upon an imaging light detector. The optical component is not present on the optical axis during the positioning of the optical fiber, but it is thereafter inserted onto the optical axis. The method further includes coarse positioning the optical component using light (preferably visible light) transmitted through the optical fiber and through the optical component to be incident upon a light energy detector, and thereafter fine positioning the optical component using light (preferably infrared light) transmitted through the optical fiber and through the optical component to be incident upon the imaging light detector.

The alignment end of the optical fiber and the optical component are preferably each mounted in their own alignment stages to accomplish the positioning steps. The alignment end of the optical fiber is preferably mounted in a five-degree-of-freedom optical-fiber alignment stage that allows the alignment end to be moved parallel to the optical axis, translated in two mutually perpendicular directions in a plane perpendicular to the optical axis, and angularly adjusted in two mutually perpendicular angles each lying in planes that include the optical axis. The optical component is preferably mounted in a six-degree-of-freedom optical-component alignment stage that permits the optical component to be moved parallel to the optical axis, translated in two mutually perpendicular directions in a plane perpendicular to the optical axis, angularly adjusted in two mutually perpendicular angles each lying in planes that include the optical axis, and rotated about the optical axis. Rotation of the optical component about the optical axis during both the coarse positioning and the fine positioning aids in achieving a precise alignment of the optical component.

The optical-fiber alignment stage and the optical-component alignment stage are each preferably automated so that the various movements are accomplished by motors in the alignment stages. The motors are driven by a feedback controller functioning responsive to the respective outputs of the imaging light detector and the light energy detector.

After the positioning and alignment, the aligned positions of the alignment end of the optical fiber and the optical component are fixed responsive to the steps of positioning the output end of the optical fiber and fine positioning the optical component.

The method described above may be practiced with any operable apparatus. Preferably, it utilizes a light source system having a light-source light output and including a visible-light source, an infrared-light source, and a light mixer that mixes the visible-light output and the infrared-light output to produce the light-source light output. The optical fiber is mounted so that the light-source light output is directed through the optical fiber. There is a light-detector system to receive the light-source light output from the optical fiber. The light-detector system has an imaging light detector having an imaging-light-detector output signal, and a light energy detector having a light-energy-detector output signal.

The present approach allows the alignment end of the optical fiber and the optical component to be precisely positioned and thereby aligned, minimizing internal transmission losses in the optical system. The final alignment is preferably accomplished in an automated fashion, avoiding errors introduced due to operator error. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
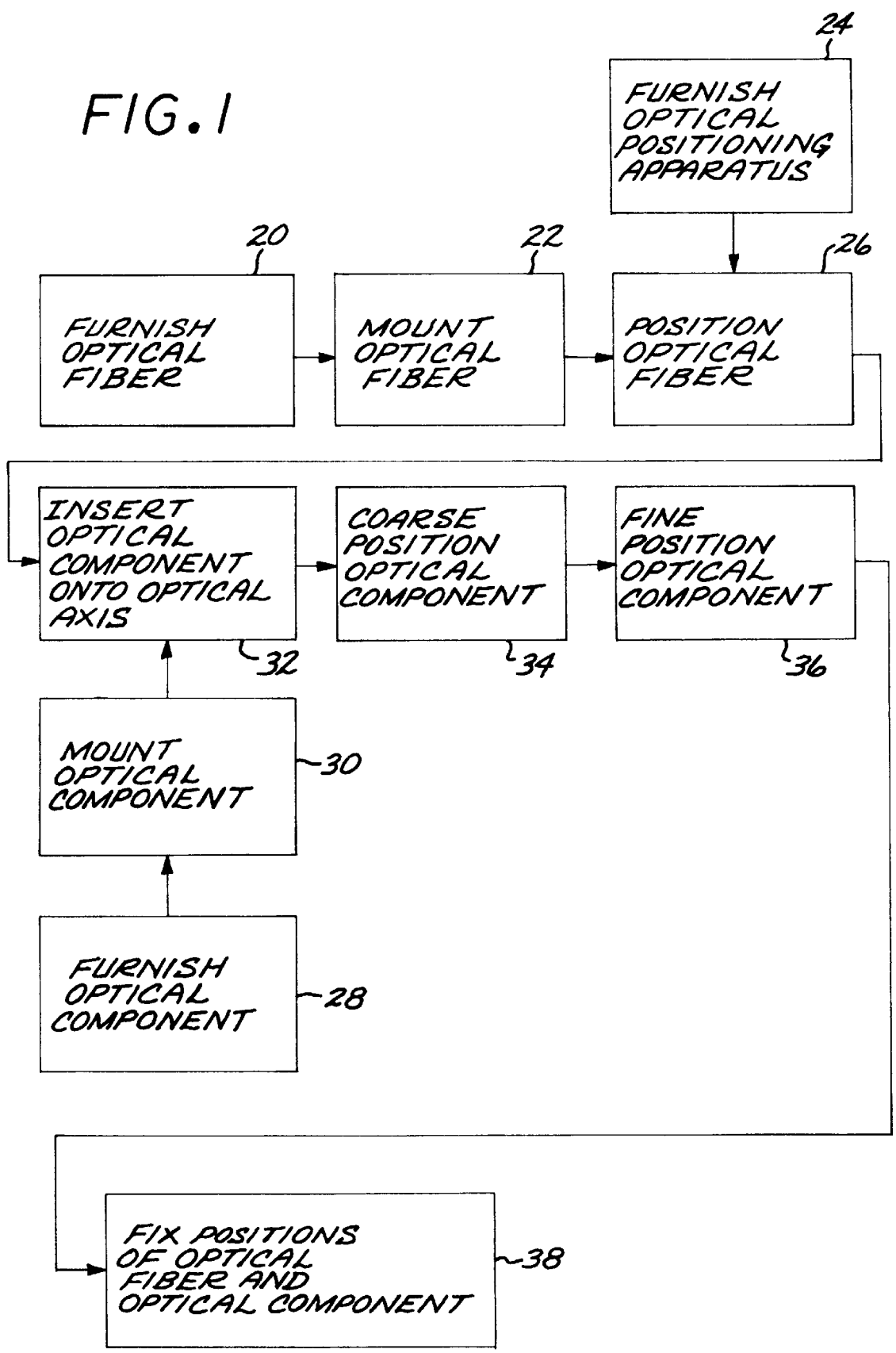
FIG. 1 is a block diagram of a method for optically positioning an optical fiber and an optical component along an optical axis.
Figure 2:
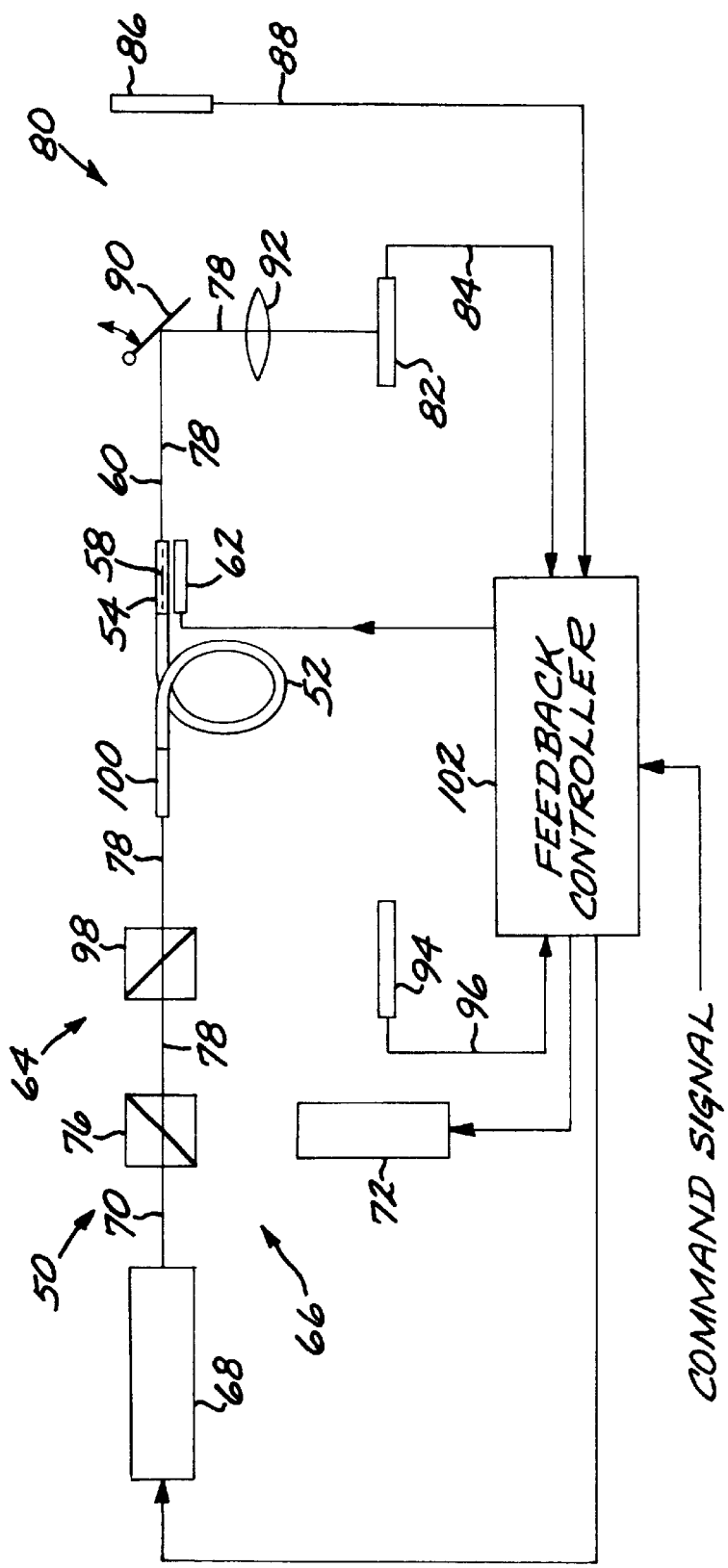
FIG. 2 is a schematic diagram of an apparatus for practicing the method of FIG. 1, in a first operating configuration.
Figure 4:
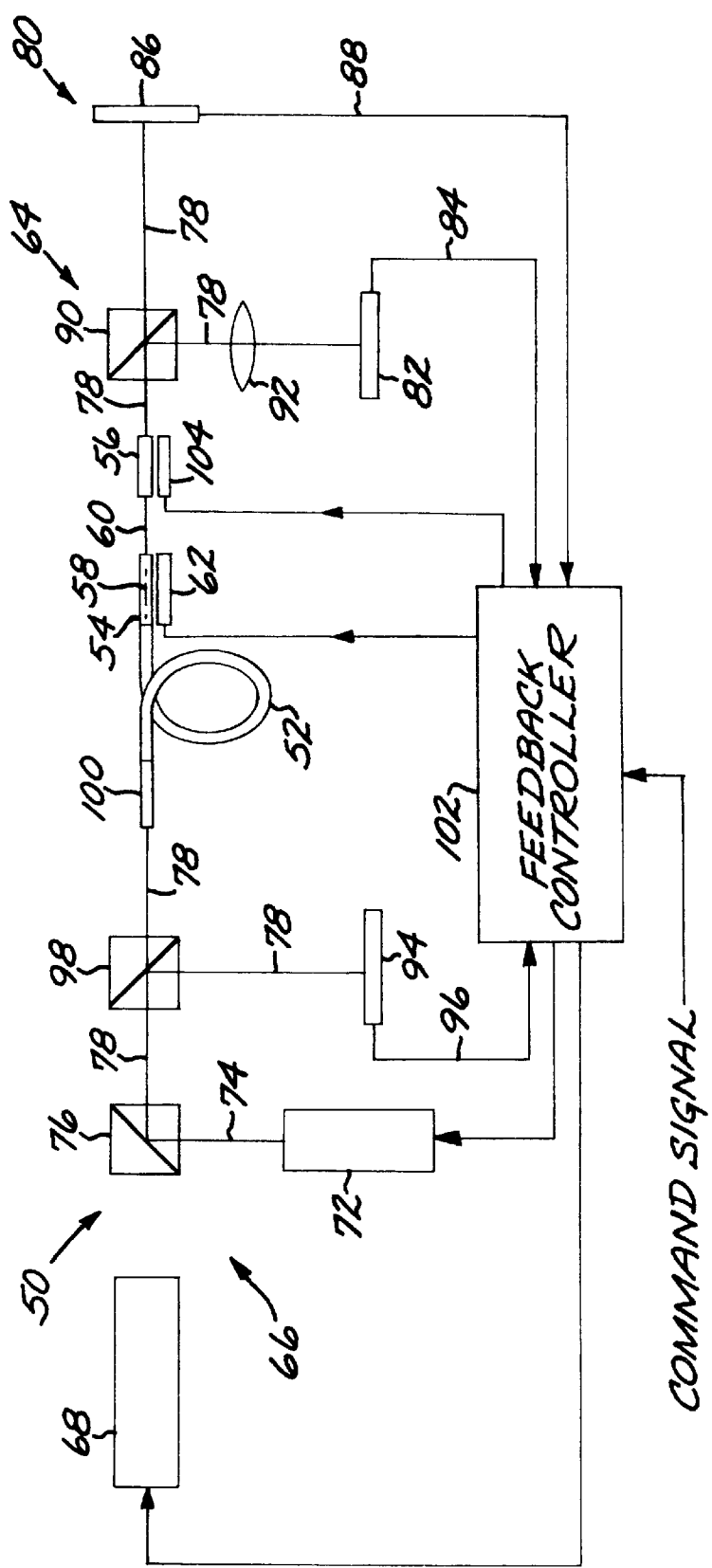
FIG. 4 is a schematic diagram of the apparatus of FIG. 2, in a second operating configuration.

FIG. 1 depicts one embodiment of a method for optically positioning an optical fiber and an optical component along an optical axis. FIGS. 2 and 4 depict one embodiment of an apparatus 50 for accomplishing the method, in two different operating configurations. In the illustrated approach, the optical fiber 52 is furnished, numeral 20. The optical fiber 52 has an alignment end 54 that is to be aligned with the optical component 56 (FIG. 4). In the illustrated embodiment, the optical fiber 52 is upstream (closer to a light source) than the optical component 56, so that the alignment end 54 is the output end of the optical fiber 52. The alignment end may instead be the input end of the optical fiber 52 in other applications. The alignment end 54 has an optical fiber axis 58 that coincides with an axis of propagation of the light beam in and from the alignment end 54. The present approach positions the alignment end 54 and the optical component 56 so that the optical fiber axis 58 is coincident with an optical axis 60 of the apparatus 50 (as well as accomplishing other functions).

In the preferred utilization, the optical component 56 is a collimating lens, and most preferably a gradient-index-of-refraction (GRIN) lens. Such a GRIN lens is known in the art for collimating the output of an optical fiber. The present approach is concerned with achieving precision positioning and alignment of the alignment end 54 and the GRIN lens or other optical component 56.

Figure 3:
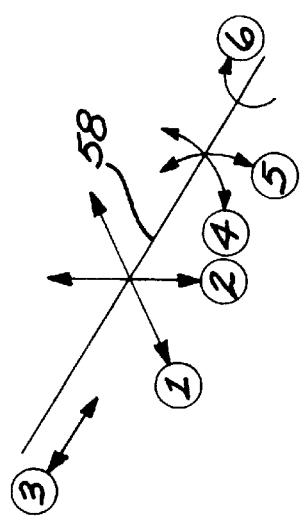
FIG. 3 is a schematic diagram illustrating the movements and modes of freedom of an alignment stage.

The alignment end 54 of the optical fiber 52 is mounted to an optical-fiber alignment stage 62 that is illustrated schematically, n umeral 22. The optical-fiber alignment stage 62 is preferably an automated mechanical stage that moves the alignment end 54 of the optical fiber 52 in the required degrees of freedom. For the present purposes, the optical-fiber alignment stage 62 preferably moves the alignment end 54 in five degrees of freedom, which are illustrated schematically in FIG. 3. The five degrees of freedom include two linear movements perpendicular to the optical fiber axis 58, labeled as numbers 1 and 2 in FIG. 3, and one linear movement parallel to the optical fiber axis 58, labeled as number 3 in FIG. 3. The five degrees of freedom further include two angular degrees of freedom in two mutually perpendicular angles each lying in mutually perpendicular planes that include the optical fiber axis 58, labeled as numbers 4 and 5 in FIG. 3. (A sixth degree of freedom, a rotation about the optical fiber axis 58 and labeled as number 6 in FIG. 3, will be discussed subsequently in relation to other elements of structure, but is not required for the optical-fiber alignment stage 62.) The mechanisms of the optical-fiber alignment stage 62 that produce these movements are conventional linear and angular actuators, preferably driven by electric motors to permit feedback control, as will be discussed subsequently.

An optical positioning apparatus 64 is furnished, numeral 24, and is illustrated in FIGS. 2 and 4. The optical positioning apparatus includes a light source system 66 having a visible-light source 68 with a visible-light output 70, an infrared-light source 72 with an infrared-light output 74 (for example at 1550 nanometers wavelength), and a light mixer 76 that mixes the visible-light output 70 and the infrared-light 74 output to produce a light-source light output 78. (For clarity of nomenclature, the light paths in FIGS. 2 and 4 are all labeled as the light-source light output 78, although the beam may be split in some cases.) The light sources 68 and 72 are preferably lasers. The light sources 68 and 72 may operate continuously or only as required, the latter being illustrated in FIGS. 2 and 4 and being preferred.

The optical positioning apparatus 64 further includes a light-detector system 80 to receive the light-source light output 78. The light-detector system 80 has an imaging light detector 82 with an imaging light detector output signal 84, and a light energy detector 86 with a light energy detector output signal 88. The imaging light detector 82 may be a full imaging device such as a charge coupled device (CCD) (e.g., a focal plane array), or it may be a limited-imaging device. One type of limited-imaging device is a quadrant detector in which the light energy incident upon four quadrants is sensed. When the measured light energy is the same on the four quadrants, the beam is centered on the origin of the four quadrants.

A controllable beam-splitter 90, such as a pivoting mirror that may be inserted into the light source light output 78 or a half-silvered mirror, controllably directs the light source light output 78 to both the imaging light detector 82 (through an appropriate imaging lens structure 92) and to the light energy detector 86. There is preferably a reference light energy detector 94 having a reference light energy detector output signal 96. The input to the reference light energy detector 94 is provided by a 50:50 beam splitter 98 that splits the light source light output 78 prior to its reaching the optical fiber 52 and the optical component 56. An optical coupler 100 couples the light source light output 78 into the optical fiber 52 in the illustrated embodiment wherein the alignment end 54 is the output end of the optical fiber 52.

A feedback controller 102 controls the operation of the apparatus 50 responsive to a command signal and responsive to the output signals 84, 88, and 96 (where present). The feedback controller 102 sends operating commands to the motors of the optical fiber alignment stage 62 and to the light sources 68 and 72. It also sends operating commands to an automated optical-component alignment stage to be discussed subsequently.

Using this structure, the alignment end 54 of the optical fiber 52 is positioned, numeral 26, so that the optical fiber axis 58 is coincident with the optical axis 60 and the light output of the optical fiber 52 is focused on the imaging light detector 82, using visible light from the visible-light source 58. The positioning 26 is performed in the configuration of FIG. 1, without the optical component 56 present on the optical axis 60, preferably in an automated fashion using the feedback controller 102. The optical-fiber alignment stage 62 is driven responsive to the imaging light detector output signal 84. The alignment end 54 is moved in as many degrees of freedom as necessary to achieve a focused, centered image on the imaging light detector 82 responsive to the imaging light detector output signal 84. At this point, the positioning and alignment of the alignment end 54 of the optical fiber 52 is complete.

The optical component 56 is furnished, numeral 28, and mounted to the automated optical-component alignment stage 104, numeral 30 and shown schematically in FIG. 4. The automated optical-component alignment stage 104 is preferably a six-axis actuator system, providing six degrees of freedom of movement of the optical component 56 relative to the optical axis 60. The six degrees of freedom are the same five degrees of freedom discussed earlier for the optical fiber alignment stage 62, plus the rotational degree of freedom indicated as number 6 in FIG. 3 for rotating the optical component 56 about the optical axis 60. The rotational degree of freedom is utilized in the coarse and fine positioning steps discussed next to ensure that the rotational position of the optical component 56 is optimized relative to the fixed rotational position of the alignment end 54 of the optical fiber 52. As discussed earlier, the feedback controller 102 drives the motors that establish the six degrees of freedom of the automated optical-component alignment stage 104.

The mounted optical component 56 is thereafter inserted onto the optical axis 60 so that the light-source light output 78 is incident upon the optical component 56 and passes through the optical component 56, numeral 32. The light-source light output 78 now passes through both the optical fiber 52 and the optical component 56. Upon insertion, the optical component 56 will typically not be well positioned and aligned relative to the alignment end 54 of the optical fiber 52.

The optical component 56 is coarse positioned, numeral 34, preferably using visible light transmitted through the optical fiber 52 from the visible-light source 68 and through the optical component 56 to be incident upon the light energy detector 86. In the preferred approach, the feedback controller 102 compares the magnitude of the light energy of the reference light energy detector output signal 96 and the light energy detector output signal 88. The feedback controller 102 drives the optical-component alignment stage 104 responsive to the comparison of these signals 88 and 96, until the light energy detector output signal 88 is as close as possible to the reference light energy detector output signal 96. Such a relation indicates that the optical component 56 is aligned in the sense that as much light as possible is passing from the optical fiber 52 into the optical component 56 in the illustrated embodiment (or the reverse, if the light travels from the optical component 56 to the optical fiber 52).

The preferred use of visible light in the initial coarse alignment of the coarse positioning step 34 makes it possible for an operator to make initial adjustments to the point where the detector outputs 84 and 88 are non-zero and have sufficient strength to allow the automated positioning control procedures to take over. Otherwise, the system could require a significant amount of time hunting for the starting point of the automated positioning.

The optical component 56 is thereafter fine positioned, numeral 36, preferably using infrared light transmitted through the optical fiber 52 from the infrared-light source 72 and through the optical component 56 to be incident upon the imaging light detector 82. The control process is similar to that described above in relation to step 34, except that the feedback controller 102 drives the optical-component alignment stage 104 responsive to the imaging-light-detector output signal 84. This fine positioning step 36 establishes the final positioning and alignment of the optical component 56. However, if desired, all or some of the steps 26, 34, and 36 may be repeated as necessary to verify the positioning and alignment and adjust them as necessary.

Figure 5:
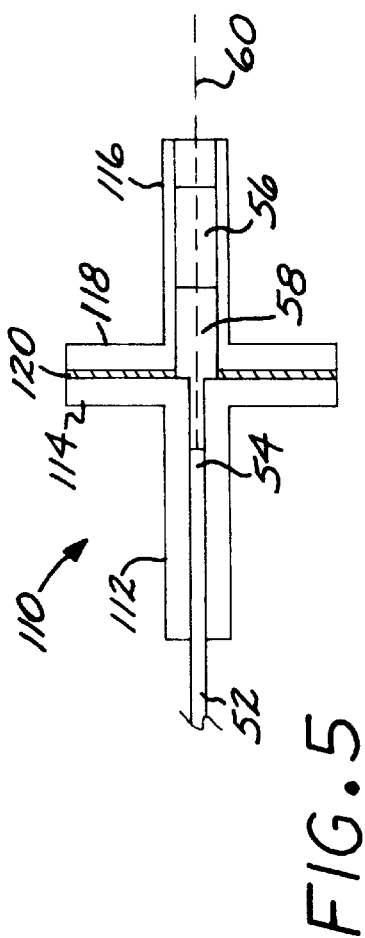
FIG. 5 is a schematic diagram of a structure for fixing the orientations of the alignment end of the optical fiber and the optical component.

After the step of fine positioning 36, and any repetitions of steps 26, 34, and 36 that may be performed, the aligned positions of the alignment end 54 of the optical fiber 52 and the optical component 56 are typically fixed, numeral 38, in response to the positions and alignment established in the steps 26, 34 and 36. Any operable structure may be used to accomplish this fixing step 38, and a presently preferred fixing structure 110 is illustrated in FIG. 5. In this structure, the optical fiber 52 is affixed within an optical fiber housing 112 having a flange end 114. The optical fiber 52 is affixed into the optical fiber housing 112 before step 26, so that the optical fiber alignment stage 62 contacts to the optical fiber housing 112. Similarly, the optical component 56 is affixed within an optical component housing 116 having a flange end 118 in facing relation to the flange end 114. The optical component 56 is affixed into the optical component housing 116 before steps 32, 34, and 36, so that the optical component alignment stage 104 contacts to the optical component housing 116. After steps 26, 34, and 36 and any repetitions are complete, the flange ends 114 and 118 are fixed together, typically with an adhesive 120 or a mechanical fastener to hold the flange ends 114 and 118, and thence the optical fiber 52 and the optical component 56, in precisely the desired position relative to each other. The flange ends 114 and 118 are generally, but usually not exactly, parallel to each other.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for optically positioning an optical fiber and an optical component along an optical axis, comprising the steps of furnishing the optical fiber having an alignment end with an optical fiber axis;

furnishing the optical component;

positioning the alignment end of the optical fiber so that the optical fiber axis is coincident with the optical axis, and light passing through the optical fiber is focused upon an imaging light detector, without the optical component present on the optical axis; thereafter inserting the optical component onto the optical axis; thereafter coarse positioning the optical component using light transmitted through the optical fiber and through the optical component to be incident upon a light energy detector; and thereafter fine positioning the optical component using light transmitted through the optical fiber and through the optical component to be incident upon the imaging-light detector.

2. The method of claim 1, wherein the step of furnishing the optical component includes the step of furnishing a collimating lens.

3. The method of claim 1, wherein the step of furnishing the optical component includes the step of furnishing a gradient-index-of-refraction lens.

4. The method of claim 1, wherein the step of positioning the alignment end of the optical fiber includes the step of mounting the optical fiber in a five-degree-of-freedom optical-fiber alignment stage.

5. The method of claim 1, wherein the step of coarse positioning the optical component includes the step of
mounting the optical component in a six-degree-of-freedom optical-component alignment stage.

6. The method of claim 1, wherein the step of coarse positioning the optical component includes the step of
rotating the optical component about the optical axis, and wherein the step of fine positioning the optical component includes the step of rotating the optical component about the optical axis.

7. The method of claim 1, wherein
the alignment end of the optical fiber is mounted in an automated optical-fiber alignment stage, and
the optical component is mounted in an automated optical component alignment stage, and wherein
the optical-fiber alignment stage is automatically driven responsive to an output of the imaging light detector, and
the optical-component alignment stage is automatically driven responsive to the output of the imaging light detector and responsive to an output of the light energy detector.

8. The method of claim 1, including an additional step, after the step of fine positioning the optical component, of
fixing a position of the alignment end of the optical fiber and the optical component responsive to the steps of positioning the alignment end of the optical fiber and fine positioning the optical component.

9. A method for optically positioning an optical fiber and an optical component along an optical axis, comprising the steps of
furnishing the optical fiber having an output end with an optical fiber axis;
furnishing the optical component;
positioning the output end of the optical fiber so that the optical fiber axis is coincident with the optical axis, and visible light passing through the optical fiber and out the output end of the optical fiber is focused upon an imaging light detector, without the optical component present on the optical axis; thereafter
inserting the optical component onto the optical axis so that the light passed through the optical fiber and out the output end of the optical fiber is incident upon the optical component and passes through the optical component;
thereafter
coarse positioning the optical component using visible light transmitted through the optical fiber, out the output end of the optical fiber, and through the optical component to be incident upon a light energy detector; and thereafter fine positioning the optical component using infrared light transmitted through the optical fiber, out the output end of the optical fiber, and through the optical component to be incident upon the imaging-light detector.

10. The method of claim 9, wherein the step of furnishing the optical component includes the step of
furnishing a collimating lens.

11. The method of claim 9, wherein the step of furnishing the optical component includes the step of furnishing a gradient-index-of-refraction lens.

12. The method of claim 9, wherein the step of positioning the output end of the optical fiber includes the step of
mounting the optical fiber in a five-degree-of-freedom optical-fiber alignment stage.

13. The method of claim 9, wherein the step of coarse positioning the optical component includes the step of
mounting the optical component in a six-degree-of-freedom optical-component alignment stage.

14. The method of claim 9, wherein the step of coarse positioning the optical component includes the step of
rotating the optical component about the optical axis.

15. The method of claim 9, wherein the step of fine positioning the optical component includes the step of
rotating the optical component about the optical axis.

16. The method of claim 9, including an additional step, after the step of fine positioning the optical component, of
fixing a position of the output end of the optical fiber and the optical component responsive to the steps of positioning the output end of the optical fiber and fine positioning the optical component.

17. A method for optically positioning an optical fiber and an optical component along an optical axis, comprising the steps of
furnishing the optical component;
mounting the optical component in an automated optical-component alignment stage;
furnishing the optical fiber having an alignment end with an optical fiber axis;
furnishing a light source system having a light-source light output and including
a visible-light source having a visible-light output,
an infrared-light source having an infrared-light output, and
a light mixer that mixes the visible-light output and the infrared-light output to produce the light-source light output;
mounting the optical fiber in an automated optical-fiber alignment stage so that the light-source light output is directed through the optical fiber;
furnishing a light-detector system to receive the light-source light output, the light-detector system having
an imaging light detector having an imaging-light-detector output signal, and
a light energy detector having a light-energy-detector output signal;
positioning the alignment end of the optical fiber so that the optical fiber axis is coincident with the optical axis, and visible light passing through the optical fiber from the visible-light source is focused upon the imaging light detector, without the optical component present on the optical axis, the step of positioning the alignment end of the optical fiber including the step of driving the optical-fiber alignment stage responsive to the imaging-light-detector output signal; thereafter
inserting the optical component onto the optical axis so that the light-source light output is incident upon the optical component and passes through the optical component; thereafter
coarse positioning the optical component using visible light transmitted through the optical fiber from the visible-light source and through the optical component to be incident upon the light energy detector, the step of coarse positioning the optical component including the step of driving the optical-component alignment stage responsive to the light-energy-detector output signal; and thereafter fine positioning the optical component using infrared light transmitted through the optical fiber from the infrared-light source and through the optical component to be incident upon the imaging light detector, the step of fine positioning the optical component including the step of driving the optical-component alignment stage responsive to the imaging-light-detector output signal.

18. The method of claim 17, wherein the step of furnishing an optical component includes the step of furnishing a collimating lens.

19. The method of claim 17, wherein the step of coarse positioning the optical component includes the step of rotating the optical component about the optical axis.

20. The method of claim 17, including an additional step, after the step of fine positioning the optical component, of fixing a position of the alignment end of the optical fiber and the optical component responsive to the steps of positioning the alignment end of the optical fiber and fine positioning the optical component.

* * * * *